United States Patent
Hershey

(10) Patent No.: US 9,581,483 B2
(45) Date of Patent: Feb. 28, 2017

(54) TANK OVERFLOW PROTECTION SYSTEM AND METHOD

(75) Inventor: George Hershey, Blue Bell, PA (US)

(73) Assignee: Honeywell International, Inc., Morris Plains, NJ (US)

( * ) Notice: Subject to any disclaimer, the term of this patent is extended or adjusted under 35 U.S.C. 154(b) by 1280 days.

(21) Appl. No.: 13/428,332

(22) Filed: Mar. 23, 2012

(65) Prior Publication Data

US 2013/0253857 A1    Sep. 26, 2013

(51) Int. Cl.
*G01F 23/18* (2006.01)
*G01F 23/00* (2006.01)

(52) U.S. Cl.
CPC ........ *G01F 23/185* (2013.01); *G01F 23/0076* (2013.01)

(58) Field of Classification Search
CPC .................... G01F 23/185; G01F 23/0076
See application file for complete search history.

(56) References Cited

U.S. PATENT DOCUMENTS

| | | | |
|---|---|---|---|
| 5,756,899 | A | 5/1998 | Ugai et al. |
| 5,811,690 | A | 9/1998 | Hershey |
| 5,900,546 | A | 5/1999 | Wilkins |
| 7,546,772 | B2 | 6/2009 | Cabuz et al. |
| 7,644,625 | B2 | 1/2010 | Ricks |
| 7,647,842 | B1 | 1/2010 | Kilian et al. |
| 7,725,273 | B2 | 5/2010 | Jannotta |
| 7,950,286 | B2 | 5/2011 | Bentley |
| 2003/0131661 | A1 | 7/2003 | Molina et al. |
| 2004/0050158 | A1 | 3/2004 | Webb |
| 2006/0213275 | A1 | 9/2006 | Cobianu et al. |
| 2007/0113665 | A1 | 5/2007 | Johnson |
| 2008/0236275 | A1* | 10/2008 | Breed et al. ................ 73/290 V |
| 2010/0284249 | A1* | 11/2010 | Steadman .................... 367/118 |
| 2011/0182782 | A1 | 7/2011 | Dzuong |
| 2014/0316583 | A1* | 10/2014 | Ambriz et al. ............... 700/277 |

FOREIGN PATENT DOCUMENTS

EP    0 996 853 B1    10/2008

OTHER PUBLICATIONS

European Search Report for EP 13158592.9 dated Jul. 26, 2013.

* cited by examiner

*Primary Examiner* — Mischita Henson
(74) *Attorney, Agent, or Firm* — Richard H. Krukar; Kermit D. Lopez; Luis M. Ortiz

(57) ABSTRACT

A tank overflow protection system and method for measuring process temperature and pressure utilizing one or more piezoresistive pressure transmitters. The piezoresistive pressure transmitter includes a differential pressure sensor and a temperature sensor. Data from the piezoresistive pressure transmitters can be digitally communicated via a cable. The pressure transmitters convert signals indicative of temperature and pressure to a digital value and transmit the signals to a main processor printed wire assembly for final compensation, diagnostics, and transmission to a distributed control system. A differential pressure can be calculated by subtracting two digital pressure measurement values. The temperature measurement can be employed to calculate any changes in density for a user-defined reference value.

16 Claims, 4 Drawing Sheets

TANK OVERFLOW PROTECTION SYSTEM AND METHOD

TECHNICAL FIELD

Embodiments are generally related to transmitter devices and methods. Embodiments are also related to pressure and temperature sensing devices and techniques. Embodiments are additionally related to tank overflow protection systems and methods.

BACKGROUND OF THE INVENTION

Liquid level in a storage tank can be controlled by measuring pressure at two measurement points, for example, one point above the fluid and another near the bottom of the tank. The fluid level can be calculated utilizing differential pressure and fluid density data. As temperature increases, the fluid density decreases and the level rises without an accompanying increase in differential pressure which leads to an inaccurate level measurement and possibly overflow of the tank.

FIG. 1 illustrates a prior art tank overflow protection system 100 that includes a remote seal transmitter 110 connected to a storage tank 150 for measuring liquid level within the tank 150. The remote seal transmitter 110 generally includes a pair of seals 120 and 130 attached to the storage tank 150. The pair of seals 120 and 130 can be attached to the remote seal transmitter 110 by fluid-filled capillaries 140 to measure differential pressure. The variable $H_1$ shown in FIG. 1 represents fluid level at time $T_1$ and the variable $H_2$ represents fluid level at a time $T_2$. The remote seal transmitter 110 with the fluid filled capillaries 140 is capable of only measuring the differential pressure. The fluid height change due to density change and level change due to temperature is undetectable with the prior art system 100 shown in FIG. 1.

Based on the foregoing, it is believed that a need exists for an improved tank overflow protection apparatus and/or method. A need also exists for an improved pressure transmitter for measuring process temperature and pressure at two measurement points with respect to, for example, a fluid storage tank, as described in greater detailed herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved pressure transmitter system and method.

It is another aspect of the disclosed embodiments to provide for an improved tank overflow protection system and method.

It is a further aspect of the disclosed embodiments to provide for an improved piezoresistive pressure transmitter for measuring process temperature and pressure data at two measurement points with respect to a storage tank.

The aforementioned aspects and other objectives and advantages can now be achieved as described herein. A tank overflow protection system and method for measuring process temperature and pressure utilizing a group of piezoresistive pressure transmitters is disclosed herein. Each piezoresistive pressure transmitter includes a differential pressure sensor and a temperature sensor. The piezoresistive pressure transmitters (e.g., two or more piezoresistive pressure transmitters, a pair of piezoresistive pressure transmitters, etc.) can be digitally communicated via a cable and connected to a top measurement point and a bottom measurement point of a storage tank in order to measure both pressure and temperature at each point. The pressure transmitters convert signals indicative of the process temperature and pressure to a digital value and transmit the signals to a main processor printed wire assembly (PWA) for final compensation, diagnostics, and transmission to a distributed control system (DCS) for controlling liquid level in the storage tank. A differential pressure can be calculated by subtracting two digital pressure measurement values from the differential pressure sensors. The temperature measurement from the temperature sensors can be employed to calculate any changes in density for a user-defined reference value.

The fluid level can be compensated for additional changes due to change in fluid density. The compensation with respect to a tank level error can be performed in the main processor printed wire assembly. The differential pressure sensor can be employed to calculate the difference in pressure between the top and the bottom of the tank. Utilizing a length of cable to maintain transmission of the pressure and temperature measurement can separate the transmitter and the main processor printed wire assembly. The apparatus provides an accurate level measurement by assessing both the pressure and temperature for density compensation.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

Figure 1:
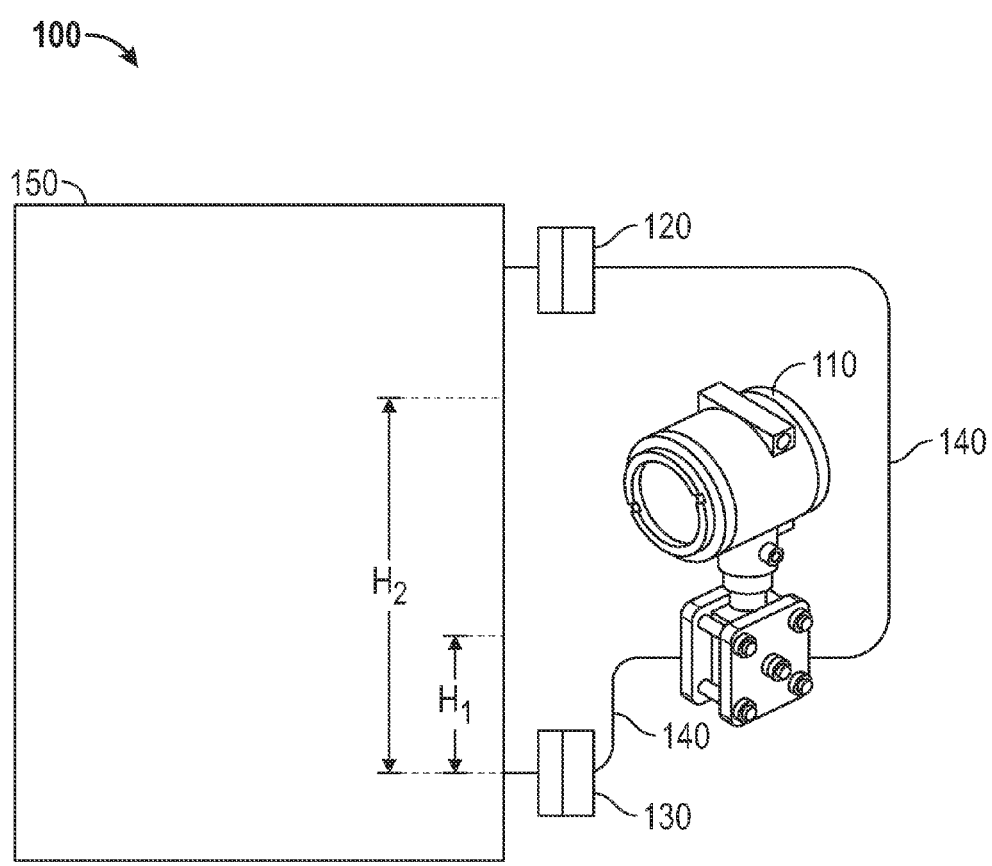
FIG. 1 illustrates a schematic diagram of a tank overflow protection system.
Figure 2:
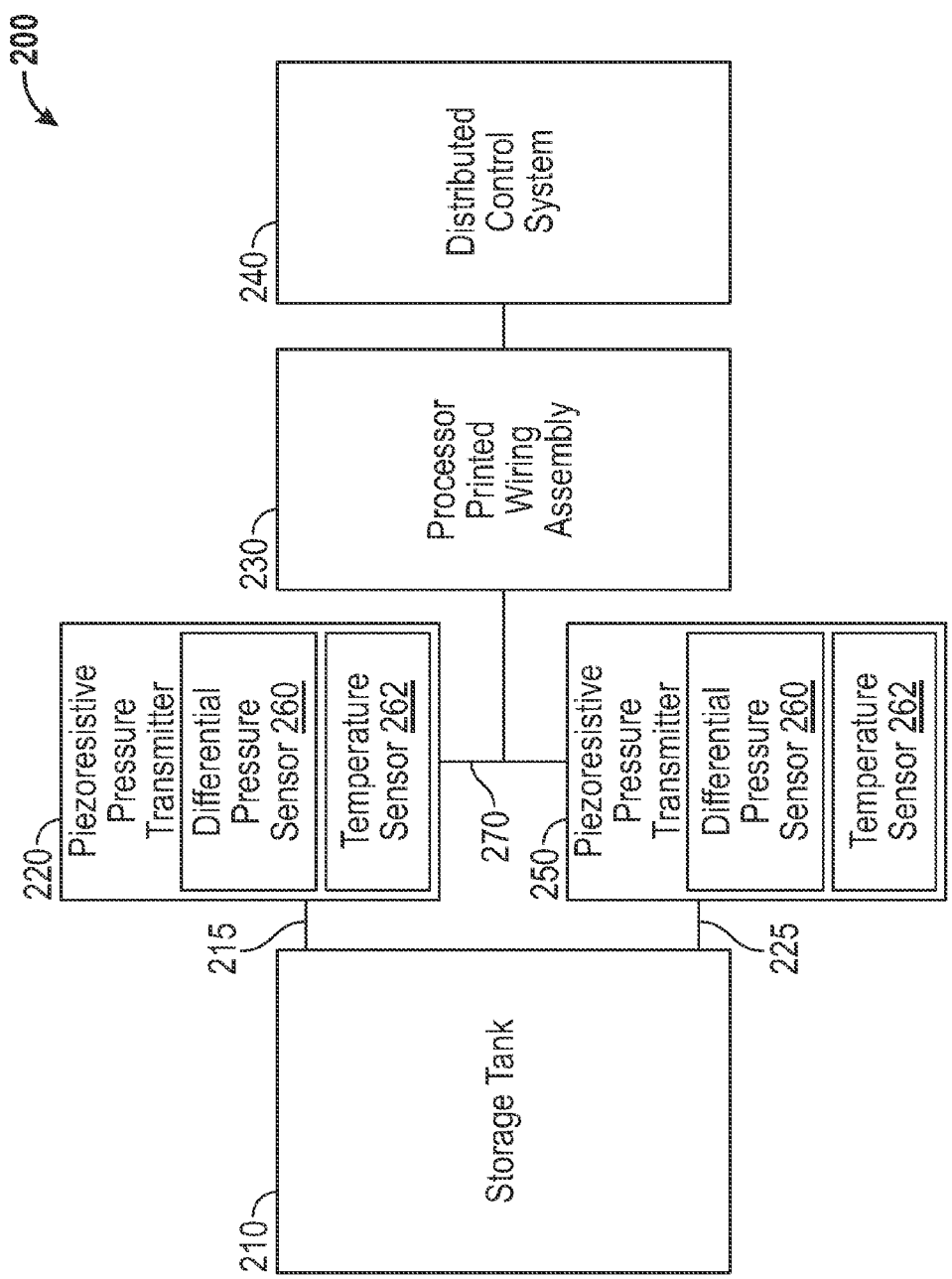
FIG. 2 illustrates a block diagram of a tank overflow protection apparatus, in accordance with the disclosed embodiments.

FIG. 2 illustrates a block diagram of a tank overflow protection system 200, in accordance with the disclosed embodiments. The tank overflow protection system 200 includes a piezoresistive pressure transmitter 220 connected to a top measurement point 215 of a storage tank 210 and a piezoresistive pressure transmitter 250 connected to a bottom measurement point 225 of the storage tank 210. The piezoresistive pressure transmitters 220 and 250 further include a differential pressure sensor 260 and a temperature sensor 262 for measuring differential pressure and temperature. The difference in pressure between the top measurement point 215 and the bottom measurement point 225 is indicative of the fluid level within the storage tank 210.

In general, the sensing material in a piezoresistive pressure sensor can be implemented in the context of a diaphragm formed on, for example, a silicon substrate, which bends with applied pressure. A deformation can occur in the crystal lattice of such a diaphragm because of this bending feature. Such deformation can cause a change in the band structure of the piezoresistors that are placed on the diaphragm, leading to a change in the resistivity of the material. This change can be, for example, an increase or a decrease according to the orientation of the resistors. The resistors can be connected as a Wheatstone bridge, the output of which is directly proportional to pressure.

The piezoresistive pressure transmitters 220 and 250 can resist shock, vibration, corrosion, and moisture. The piezoresistive pressure transmitters 220 and 250 digitally and electronically communicate via a cable 270 (e.g., electric/electronic cable, wire, etc.) in order to measure both pressure and temperature at each point. The tank overflow protection system 200 further includes a main processor printed wire assembly 230 to receive digital signals indicative of the process temperature and pressure from the pressure transmitters 220 and 250 for final compensation, diagnostics, and transmission to a distributed control system (DCS) 240. The pressure and temperature measurements can be transmitted to the distributed control system 240 for controlling the liquid level in storage tank 210.

In general, the distributed control system refers to a control system usually of a manufacturing system, process or any kind of dynamic system, in which the controller elements are not central in location but are distributed throughout the system with each component sub-system controlled by one or more controllers. When a measured variable reaches a certain point, the controller instructs a valve or actuation device to open or close until the fluidic flow process reaches the desired set point. The piezoresistive pressure transmitters 220 and 250 and the main processor printed wire assembly 230 can be separated by utilizing a length of cable to maintain transmission of the pressure and temperature measurement.

Figure 3:
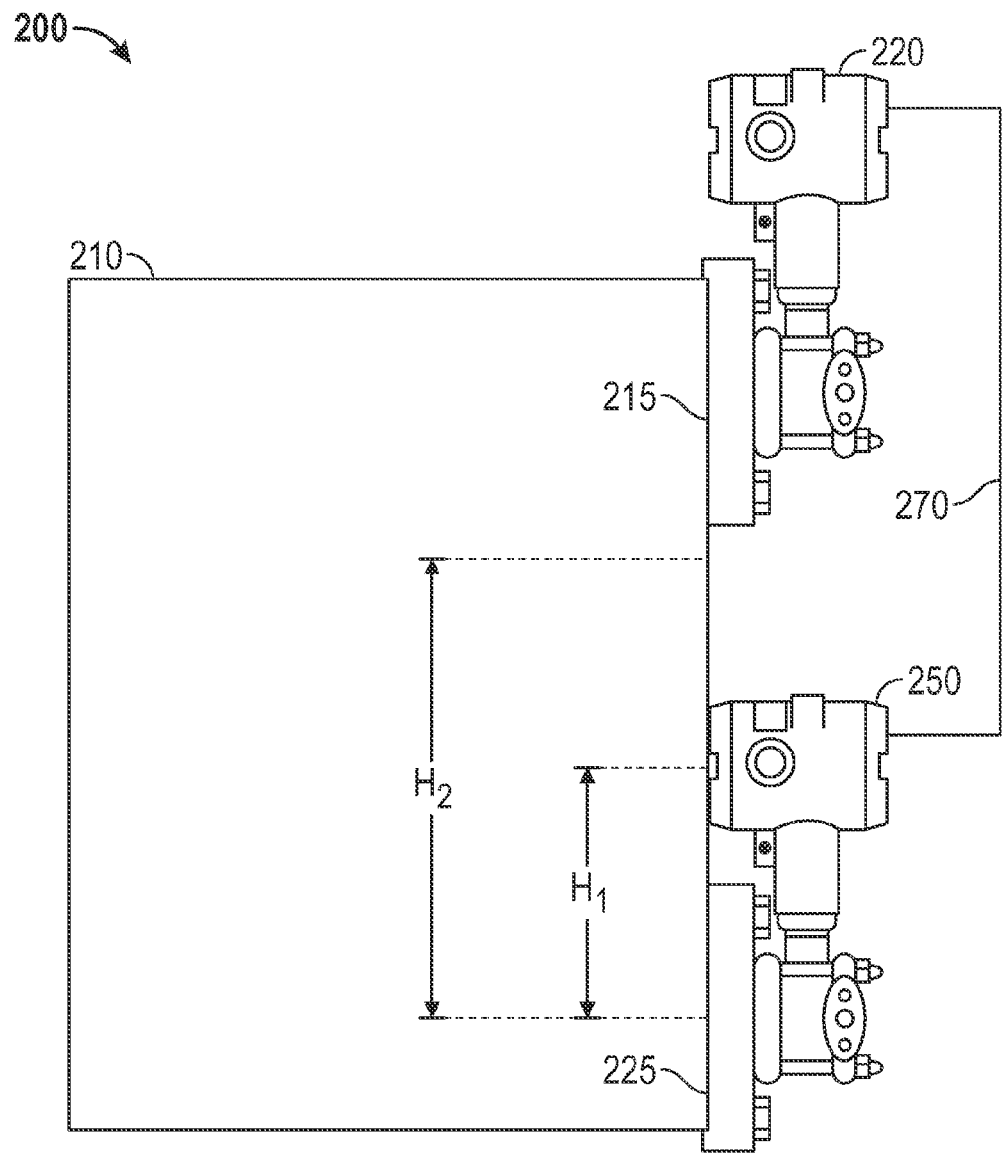
FIG. 3 illustrates a schematic diagram of a tank overflow protection apparatus having two or more piezoresistive pressure transmitters, in accordance with the disclosed embodiments.

FIG. 3 illustrates a schematic diagram of a tank overflow protection system 200 having the piezoresistive pressure transmitters 220 and 250, in accordance with the disclosed embodiments. Note that in FIGS. 2-4, identical or similar blocks are generally indicated by identical reference numerals. The piezoresistive pressure transmitters 220 and 250 can be employed to calculate the difference in pressure between the top and the bottom of the storage tank 210. The main processor printed wire assembly 230 calculates the differential pressure by subtracting two digital pressure measurements values from the differential pressure sensor 260. The temperature measurement from the temperature sensor 262 can be employed to calculate any changes in density for a user-defined reference value. The term $H_1$ represents fluid level at time $T_1$ and the term $H_2$ represents fluid level at time $T_2$. The fluid level can be compensated for additional changes due to change in fluid density. The compensation with respect to a tank level error can be performed in the main processor printed wire assembly 230.

The piezoresistive pressure transmitters 220 and 250 can readily adapt to a variety of ranges of operation, has a comparatively low cost of construction, is readily assembled, presents a low risk of damage to the electronics during assembly or operation, is accurate and reliable in operation, and is more readily cleaned than known prior art. When utilized in the preferred embodiment illustrated and described herein above, the present invention also provides extremely important advantage that it can provide all of the foregoing advantages while presenting less process complexity due to reduced product volume with a fewer number of part count. Various alterations and modifications will occur to those skilled in the art from the foregoing detailed description of the invention and the accompanying drawings.

Figure 4:
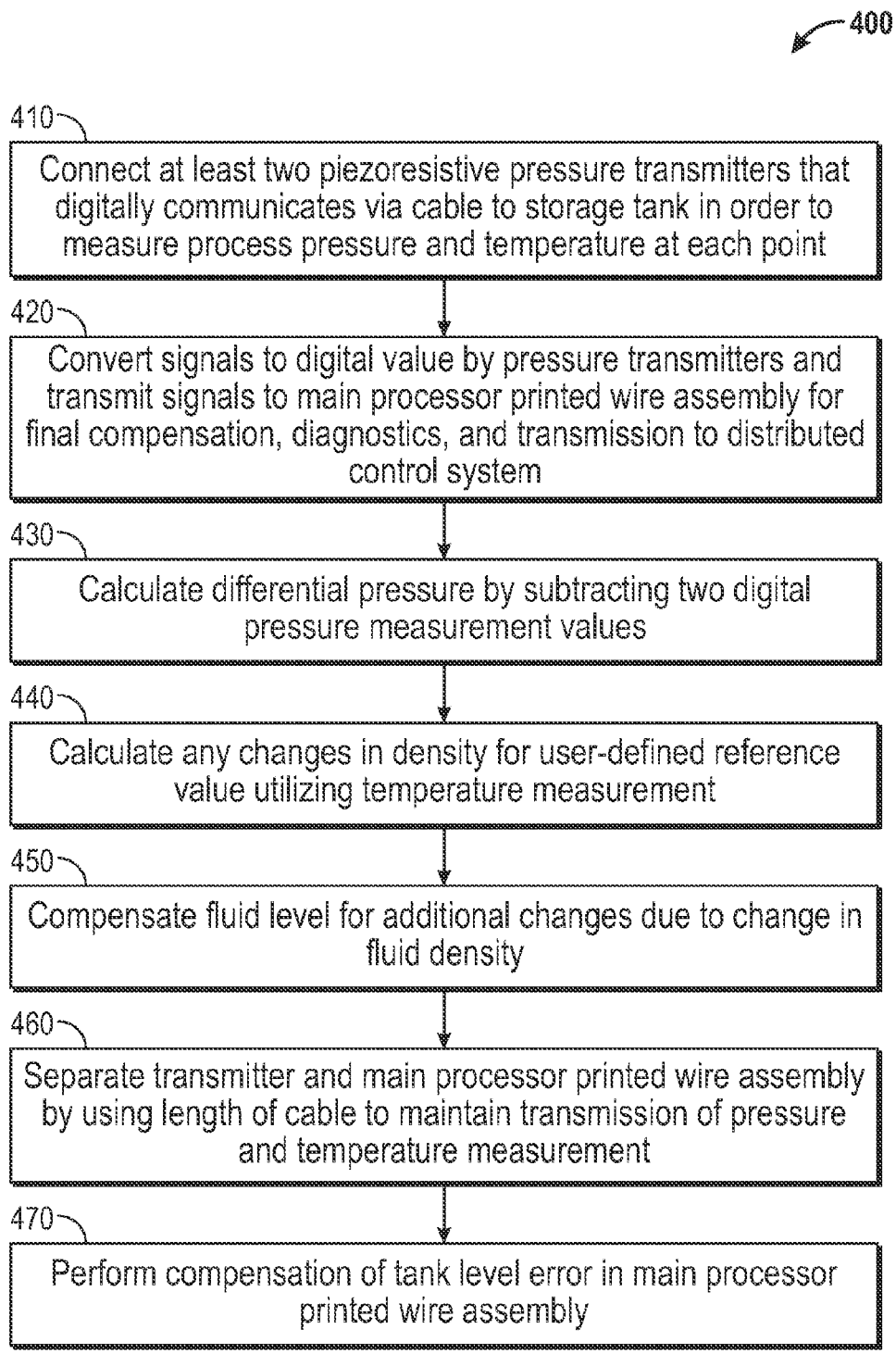
FIG. 4 illustrates a high level flow chart of operations illustrating logical operational steps of a method for measuring process temperature and pressure at two measurement points with respect to a storage tank utilizing the piezoresistive pressure transmitters, in accordance with the disclosed embodiments.

FIG. 4 illustrates a high level flow chart of operations illustrating logical operational steps of a method 400 for measuring process temperature and pressure at two measurement points 215 and 225 with respect to the storage tank 210 utilizing the piezoresistive pressure transmitters 220 and 250, in accordance with the disclosed embodiments. Initially, as depicted at block 410, the piezoresistive pressure transmitters 220 and 250 that communicate via the cable 270 can be connected to the storage tank 210 in order to measure pressure and temperature at each point. The signals can be converted to a digital value by the piezoresistive pressure transmitters 220 and 250 and the signals can be transmitted to the main processor printed wire assembly 230 for final compensation, diagnostics, and transmission to the distributed control system 240, as illustrated at block 420. Next, as shown at block 430, the differential pressure can be calculated by subtracting two digital pressure measurements values.

The changes in density for a user-defined reference value can be calculated utilizing the temperature measurement, as illustrated at block 440. The fluid level can be compensated for additional changes due to a change in fluid density, as indicated at block 450. The transmitters 220 and 250 and the main processor printed wire assembly 230 can be separated utilizing a length of cable to maintain transmission of the pressure and temperature measurement, as shown at block 460. The undetected tank level change with a change in temperature can be calculated as follows: for example, assume a linear fit of density change with temperature (i.e., other curve fits can also be employed).

$$d_2 = d_1 + d_f^*(T_2 - T_1) \qquad (1)$$

wherein $d_2$ represents fluid density at time 2, $d_1$ represents fluid density at time 1, $d_f$ represents slope of linear change of density versus temperature, $T_{H1}$ represents HP fluid temperature at time 1, $T_{H2}$ represents HP fluid temperature at time 2, $T_{L1}$ represents LP fluid temperature at time 1, and $T_{L2}$ represents LP fluid temperature at time 2. For this example, assume that fluid temperature is uniform at each time ($T_{H1}=T_{L1}=T_1$ and $T_{H2}=T_{L2}=T_2$). Similar calculations can be performed for non-uniform temperature distribution across the fluid $$(P_{H1}-P_{L1})/d_1=H_1 \quad (2)$$

$$(P_{H2}-P_{L2})/d_2=H_2 \quad (3)$$

wherein $P_{H1}$ represents HP pressure at time 1, $P_{L1}$ represents LP pressure at time 1, $P_{H2}$ represents HP pressure at time 2, and $P_{L2}$ represents LP pressure at time 2. The level error can be calculated as shown in below in equation (4):

$$\text{Level Error}=H_1-H_2=(P_{H1}-P_{L1})/d_1-(P_{H2}-P_{L2})/(d_1+d_f^*(T_2-T_1)) \quad (4)$$

For no change in DP:

$$P_{H1}-P_{L1}=P_{H2}-P_{L2}=DP \quad (5)$$

The level error can be calculated as shown in below in equation (6):

$$\text{Level Error}=H_1-H_2=DP^*d_f^*(T_2-T_1)/(d_1^*(d_1+d_f^*(T_2-T_1))) \quad (6)$$

Finally, as illustrated at block 470, the compensation with respect to the tank level error can be performed in the main processor printed wire assembly 230. The system 200 therefore provides an accurate level measurement by assessing both pressure and temperature for density compensation.

Based on the foregoing, it can be appreciated that a number of embodiments, preferred and alternative, are disclosed herein. For example, in an embodiment, an overflow protection system for a storage tank can be implemented. Such a system can include, for example, a group of piezoresistive pressure transmitters, wherein each piezoresistive pressure transmitter among such piezoresistive pressure transmitters can include a differential pressure sensor and a temperature sensor. Such a system can also include an electronic cable for digitally and electrically communicating data to and from the piezoresistive pressure transmitters; the piezoresistive pressure transmitters are capable of being connected to a top measurement point and a bottom measurement point of the storage tank in order to accurately measure process temperature and pressure data for use in preventing overflow of the storage tank. Additionally, such a system can include a processor printed wire assembly for receiving a digital signal indicative of the process temperature and pressure data from the piezoresistive pressure transmitters for compensation, diagnostics, and transmission thereof to a distributed control system.

In another embodiment, the processor printed wire assembly can calculate differential pressure data by subtracting at least two digital pressure measurement value outputs from the differential pressure sensor. In yet another embodiment, processor printed wire assembly can calculate a change in density with respect to a user-defined reference value utilizing a temperature measurement value output from the temperature sensor. In still another embodiment, the processor printed wire assembly can perform a compensation calculation with respect to a storage tank level error in the main processor printed wire assembly. In yet another embodiment, the piezoresistive pressure transmitters and the processor printed wire assembly can be separated utilizing a length of cable (e.g., the aforementioned electronic cable or another cable/wire) to maintain a transmission of pressure and temperature measurement data.

In another embodiment, the piezoresistive pressure transmitters can include at least two piezoresistive pressure transmitters. In still another embodiment, the piezoresistive pressure transmitters can include at least one piezoresistive pressure transmitter. In other embodiments, the processor printed wire assembly can be capable of calculating differential pressure data by subtracting at least two digital pressure measurement value outputs from the differential pressure sensor, and calculating a change in density with respect to a user-defined reference value utilizing a temperature measurement value output from the temperature sensor. In other embodiments, the processor printed wire assembly can also be capable of performing a compensation calculation with respect to a storage tank level error in the main processor printed wire assembly.

In another embodiment, a method for preventing overflow of a storage tank can be implemented. Such a method can include, for example, the steps of connecting two or more or a group (e.g., a pair) of piezoresistive pressure transmitters, wherein piezoresistive pressure transmitter among the piezoresistive pressure transmitters includes a differential pressure sensor and a temperature sensor connected to a top measurement point and a bottom measurement point of the storage tank for accurately measuring process temperature and pressure data; calculating a differential pressure by subtracting at least two digital pressure measurement values from the differential pressure sensor utilizing a processor printed wire assembly; and determining a change in density with respect to a user-defined reference value utilizing a temperature measurement value output from the temperature sensor by the processor printed wire assembly in order to prevent overflow of the storage tank.

In another embodiment, a step can be implemented for digitally communicating data to and from the piezoresistive pressure transmitters. In other embodiments, steps can be implemented for converting a signal indicative of the process temperature and pressure to a digital value by the piezoresistive pressure transmitters; and transmitting the signal to the main processor printed wire assembly for final compensation, diagnostics, and transmission to a distributed control system for controlling a level of fluid in the storage tank.

In yet other embodiments, steps can be provided for compensating a level of fluid in the storage tank with respect to an additional change due to a change in a fluid density of the fluid in the storage tank; and performing a compensation calculation with respect to a tank level error in the main processor printed wire assembly. In another embodiment, a step can be implemented for separating the piezoresistive pressure transmitters and the processor printed wire assembly utilizing a length of the electronic cable to maintain a transmission of data indicative of pressure and temperature measurements. In another embodiment, a step can be provided for configuring the piezoresistive pressure transmitters comprise two or more piezoresistive pressure transmitters. In yet another embodiment, a step can be implemented for configuring the piezoresistive pressure transmitters to comprise at least one piezoresistive pressure transmitter.

In still another system embodiment, an overflow protection system for a storage tank can be implemented. Such a system can include, for example, two or more or a group (e.g., a pair) of piezoresistive pressure transmitters, wherein each piezoresistive pressure transmitter among the piezoresistive pressure transmitters includes a differential pressure sensor and a temperature sensor; and an electronic cable for digitally and electrically communicating data to and from the piezoresistive pressure transmitters, the piezoresistive pressure transmitters capable of being connected to a top measurement point and a bottom measurement point of the storage tank in order to accurately measure process temperature and pressure data for use in preventing overflow of the storage tank.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. An overflow protection system for a storage tank, said system comprising:
   a plurality of piezoresistive pressure transmitters, wherein each piezoresistive pressure transmitter among said plurality of piezoresistive pressure transmitters includes a differential pressure sensor and a temperature sensor;
   an electronic cable for digitally and electrically communicating data to and from said plurality of piezoresistive pressure transmitters, said plurality of piezoresistive pressure transmitters capable of being connected to a top measurement point and a bottom measurement point of said storage tank to measure process temperature and pressure data; and
   a processor printed wire assembly for receiving a digital signal indicative of said process temperature and pressure data from said plurality of piezoresistive pressure transmitters for at least one of compensation, diagnostics, and transmission to a distributed control system, wherein said processor printed wire assembly calculates differential pressure data by subtracting at least two digital pressure measurement value outputs from said differential pressure sensor.

2. The system of claim 1 wherein said processor printed wire assembly calculates a change in density with respect to a user-defined reference value utilizing a temperature measurement value output from said temperature sensor.

3. The system of claim 1 wherein said processor printed wire assembly performs a compensation calculation with respect to a storage tank level error.

4. The system of claim 1 wherein said plurality of piezoresistive pressure transmitters and said processor printed wire assembly are separated utilizing a length of cable to maintain a transmission of pressure and temperature measurement data.

5. The system of claim 1 wherein said plurality of piezoresistive pressure transmitters comprises at least two piezoresistive pressure transmitters.

6. The system of claim 1 wherein said plurality of piezoresistive pressure transmitters comprises at least one piezoresistive pressure transmitter.

7. A method for preventing overflow of a storage tank, said method comprising:
   connecting a plurality of piezoresistive pressure transmitters, wherein piezoresistive pressure transmitter among said plurality of piezoresistive pressure transmitters includes a differential pressure sensor and a temperature sensor connected to a top measurement point and a bottom measurement point of said storage tank for measuring process temperature and pressure data;
   calculating a differential pressure by subtracting at least two digital pressure measurement values from said differential pressure sensor utilizing a processor printed wire assembly; and
   determining a change in density with respect to a user-defined reference value utilizing a temperature measurement value output from said temperature sensor by said processor printed wire assembly.

8. The method of claim 7 further comprising digitally communicating data to and from said plurality of piezoresistive pressure transmitters.

9. The method of claim 7 further comprising:
   converting a signal indicative of said process temperature and pressure to a digital value by said plurality of piezoresistive pressure transmitters; and
   transmitting said signal to said main processor printed wire assembly for final compensation, diagnostics, and transmission to a distributed control system for controlling a level of fluid in said storage tank.

10. The method of claim 7 further comprising:
    compensating a level of fluid in said storage tank due to a change in a fluid density of said fluid in said storage tank indicative of a tank error; and
    performing a compensation calculation with respect to a tank level error in said main processor printed wire assembly.

11. The method of claim 7 further comprising separating said plurality of piezoresistive pressure transmitters and said processor printed wire assembly utilizing a length of said electronic cable to maintain a transmission of data indicative of pressure and temperature measurements.

12. The method of claim 7 further comprising configuring said plurality of piezoresistive pressure transmitters to comprise at least two piezoresistive pressure transmitters.

13. The method of claim 7 further comprising configuring said plurality of piezoresistive pressure transmitters to comprise at least one piezoresistive pressure transmitter.

14. An overflow protection system for a storage tank, said system comprising:
    a plurality of piezoresistive pressure transmitters, wherein each piezoresistive pressure transmitter among said plurality of piezoresistive pressure transmitters includes a differential pressure sensor and a temperature sensor;
    an electronic cable for digitally and electrically communicating data to and from said plurality of piezoresistive pressure transmitters, said plurality of piezoresistive pressure transmitters connectable to a top measurement point and a bottom measurement point of said storage tank to measure process temperature and pressure data; and
    a processor printed wire assembly wherein said processor printed wire assembly calculates differential pressure data by subtracting at least two digital pressure measurement value outputs from said differential pressure sensor.

15. The system of claim 14 wherein the processor printed wire assembly receives a digital signal indicative of said process temperature and pressure data from said plurality of piezoresistive pressure transmitters for compensation, diagnostics, and transmission to a distributed control system.

16. The system of claim 15 wherein said processor printed wire assembly calculates a change in density with respect to a user-defined reference value utilizing a temperature measurement value output from said temperature sensor.

* * * * *